Jan. 19, 1960 H. SUHL 2,922,129

HALL EFFECT DEVICE FOR ELECTROMAGNETIC WAVES

Filed July 8, 1953

INVENTOR
H. SUHL
BY Hugh S. Wertz
ATTORNEY

United States Patent Office 2,922,129
Patented Jan. 19, 1960

2,922,129

HALL EFFECT DEVICE FOR ELECTROMAGNETIC WAVES

Harry Suhl, Irvington, N.J., assignor to Bell Telephone Laboratories, Incorporated, New York, N.Y., a corporation of New York Application July 8, 1953, Serial No. 366,733

3 Claims. (Cl. 333—98)

This invention relates to transmission devices and particularly to transmission devices utilizing Hall effect materials for controlling the velocity of propagation of electromagnetic waves.

A Hall effect material is characterized as one which has the property that the application of a magnetic field thereto causes a deflection of the current flowing in the material in a direction perpendicular to both the magnetic field and the direction of current flow.

It has been observed that when elliptically polarized electromagnetic waves are propagated through a signal-transparent body of ferromagnetic material or semiconductor material, particularly Hall effect material, and a magnetic field is applied to the body in the direction of wave propagation, the velocity of propagation of some of the components of the wave will be changed. When the wave is plane polarized the change in propagation velocity of the components causes an angular rotation of the plane of polarization. This rotation is a Faraday type effect, i.e., antireciprocal. Bodies that selectively vary the velocity of propagation of components of electromagnetic waves and may be used to effect rotation of the plane of polarization have been found to be of particular use in wave guide circuitry. However, as known to the art, such bodies of active material must be projected into the path of the wave so that the wave is propagated through the body. This arrangement causes reflections of the wave from the face of the body thereby introducing transmission losses and causing signal-matching problems. In addition, as the material is signal-transparent and has low impedance characteristics, the circuit in which it is used will have low impedance characteristics and be limited to such use.

It is an object of this invention to overcome the above described limitations and to provide a new and improved structure for controlling the velocity of propagation of electromagnetic waves.

A more specific object of the invention is to reduce reflection losses and to increase the frequency range and coupling efficiency of Faraday type rotators of plane polarized waves in wave guide systems.

Another specific object of the invention is to increase the high impedance characteristics of microwave cavity tuners.

The invention contemplates a longitudinally polarized tubular member of Hall effect material which supports wave transmission having a thickness corresponding to a skin depth and which may be used, in one embodiment, as a section of a circular wave guide to produce anti-reciprocal rotation of a plane polarized wave and, in another embodiment, as a structural parameter of a cavity tuner to control the frequency of a transmitted signal.

Figure 1:
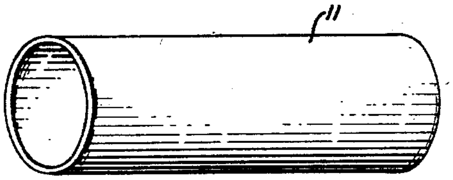
Figure 2:
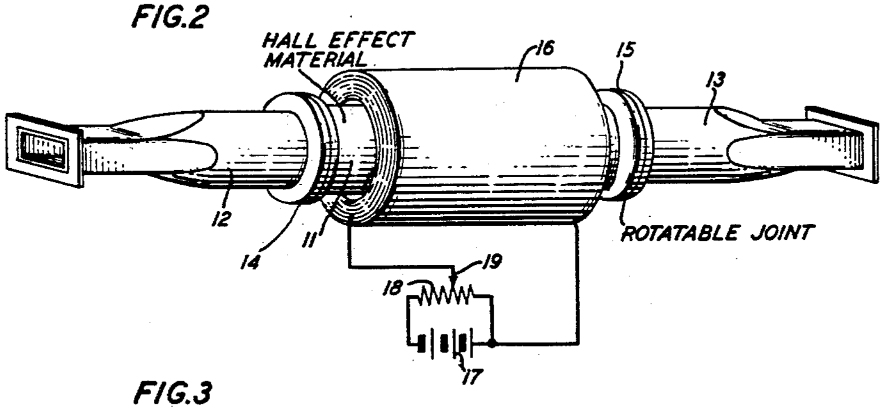
Figure 3:
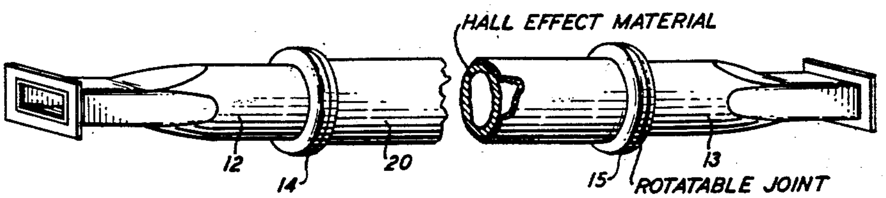
Figure 4:
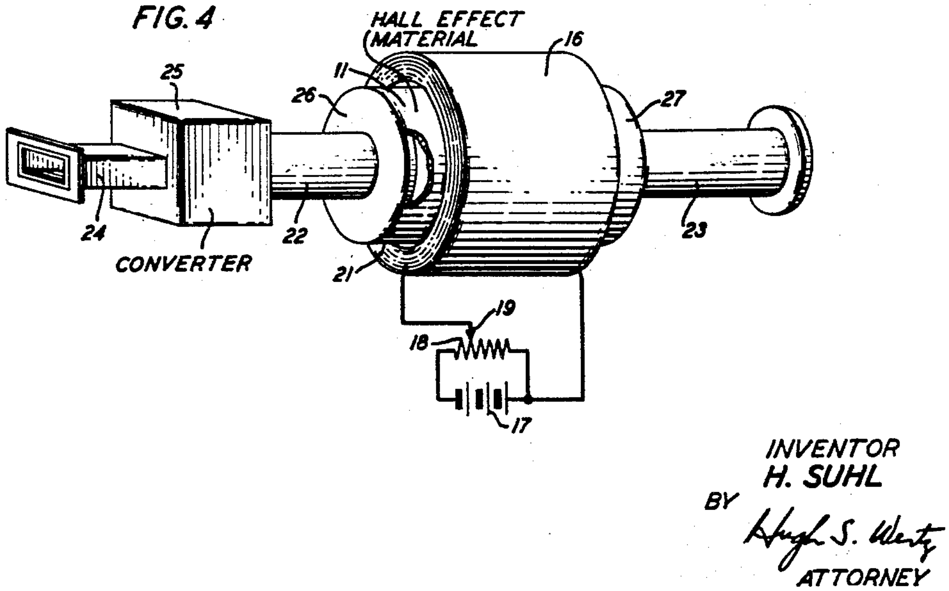

The invention, its objects, and its advantages will be better understood by referring to the following description and drawings forming a part thereof wherein:

Fig. 1 is a perspective view of a body of Hall effect material useful singly or in combination as an embodiment of the invention;

Figs. 2 and 3, which are partly in perspective and partly diagrammatical, show respectively, embodiments of the invention utilizing the Hall effect material of Fig. 1; and Fig. 4 is a perspective view of a wave guide system cavity tuner embodying the invention.

Referring more particularly to Fig. 1, there is shown a tubular body 11 of semiconductor material, particularly Hall effect material such as, for example, germanium, bismuth and indium antimony. Of the known Hall effect materials, it is found that those having a high carrier mobility of at least 50,000 cm.$^2$ volt second and a high carrier concentration measured at .03 to .10 ohm centimeter such as indium antimony are preferred for use in the disclosed embodiments. To effect the change in velocity of propagation, circularly polarized waves must be transmitted through the section 11 in the direction of its longitudinal axis and parallel to the lines of force of a magnetic field. The effect can be conveniently produced by arranging the section inside of and coaxial to a solenoid.

A circularly polarized wave rotating in the direction of the positive electric current which produces the magnetic field is designated as positive, and a circularly polarized wave rotating in the other direction is designated as negative. It is well known in the art that to the positive circularly polarized wave the electric displacement in the tubular member is decreased and the dielectric constant is decreased proportionately over the static dielectric constant of the material. (See Chapter 7 of Optik by Max Born, published by J. Springer, Berlin, 1933. Also see Electromagnetic Theory by J. D. Stratton, paragraph 5.16, pp. 327–330.) As the velocity of propagation $c$ of the wave is $$c=\frac{1}{\sqrt{\mu\epsilon}} \qquad (1)$$

where $\mu$=the permeability and $\epsilon$ is the dielectric constant, when the dielectric constant decreases the velocity of propagation increases. So that for a positive circularly polarized wave the velocity of propagation through the Hall effect material increases. However, the electric displacement in the material is substantially unaffected by a negative circularly polarized wave. Hence, for the negative wave the dielectric constant and velocity of propagation remains substantially unchanged. It is these changes in the velocity of propagation of circularly polarized electromagnetic waves produced in the above-described manner that are utilized in the following embodiments.

In Fig. 2 there is shown one embodiment of the invention for antireciprocally rotating the plane of polarization of electromagnetic waves. In this embodiment a tubular member 11 of Hall effect material is mounted between two aligned circular to rectangular transition wave guide members 12 and 13. The tubular member 11 may have an inner diameter equal to that of the inner diameter of the circular portions of sections 12 and 13 and a thicknes sufficient to support the transmission of electromagnetic waves at a skin depth. The members 11, 12 and 13 may be joined together by means of flanges 14 and 15, one or more of which may be rotatable, or in any other suitable manner known to the art. A solenoid 16 is mounted upon the outside of the member 11 and is supplied with a source 17 of energizing current represented for purposes of illustration, as a battery shunted by a potentiometer 18 having a variable contact 19.

In the operation of the system of Fig. 2 as a rotator the rectangular portions of the wave guide sections 12 and 13 serve as polarizers for plane waves in which they will accept only that component of the electric vector which is consistent with the $TE_{10}$ mode in the rectangular guide and by means of the smooth transition from rectangular to circular cross section this mode goes over to the $TE_{11}$ mode in the circular portion of the guide. The dimensions of the wave guides are preferably chosen so that only the dominant mode in each can be propagated. The solenoid, when energized, provides an axial magnetic field in the direction of longitudinal axis of member 11. A polarized wave of suitable frequency received from an oscillator and impressed upon section 12 is, in the absence of the magnetic field, carried through member 11 to section 13 without any change in the plane of polarization and without any attenuation. With the application of a magnetic field by source 17 and solenoid 16, however, a rotation of the plane of polarization will take place. This is due to the fact that a plane polarized wave passing through the tubular section 11 of Hall effect material may be thought of as producing two sets of secondary waves at substantially a skin depth in the material, each set being circularly polarized in opposite senses. One set includes positive circularly polarized waves and the other includes negative circularly polarized waves. In accordance with the foregoing explanation, the velocity of propagation of the positive waves is increased while the velocity of propagation of the negative waves remains substantially unchanged. Upon emergence from the tubular section the secondary waves in combination set up a plane polarized wave which is in general polarized at a different angle from the original wave.

The angle of rotation $\Phi$ may be expressed in general terms as:

$$\frac{K\times\frac{\epsilon_0}{\epsilon_1}\times d\times c}{A}=\Phi \text{ per unit length per gauss} \quad (2)$$

where K is the angle of rotation per unit length per gauss in the infinite medium, $\epsilon_0$ the dielectric constant in a vacuum, $\epsilon_1$ the dielectric constant of the material, $d$ the skin depth of the material, $c$ the inner circumference of the member and A the cross-sectional area of the Hall effect member. In an actual embodiment of Fig. 2, where the physical properties and dimensions of the member have been selected in accordance with the above-described conditions and are fixed, the angle of rotation can be controlled by controlling the intensity of the applied magnetic field as determined by the potentiometer 18 and source 17. At the same time the wave guide section 13 may be rotated into alignment with the new plane of polarization to receive the emerging polarized wave. This embodiment of the invention finds a use not only as a gyrator, circulator and isolator circuit elements that are well known in the art, but also as a variable attenuator, modulator, and phase shifter.

Fig. 3 shows an alternate embodiment of the rotator of Fig. 2. A circular wave guide section 20 is mounted between two aligned circular to rectangular transition wave guide members 12 and 13. In this embodiment the inner surface of wave guide section 20 is coated with a layer of Hall effect material of a thickness substantially equal to a skin depth at the lowest signal frequency. The thickness of the material and wave guide sections are exaggerated for purposes of illustration. By prepolarizing the Hall effect material in a direction parallel to the longitudinal axis of the wave guide a rotation of the plane of polarization of an electromagnetic wave will be produced therein similar to that effected in the embodiment of Fig. 2. The angle of rotation can be controlled by the degree to which the Hall effect material is prepolarized and also by the length of wave guide section 20. It is, of course, abvious that in the embodiment of Fig. 3 the Hall effect material need not be prepolarized but that polarization may be accomplished by enclosing the wave guide 20 with a solenoid 16 as shown in Fig. 2.

In Fig. 4 there is shown a tuned circuit of the cavity resonator type for generating signals of a chosen frequency. There is shown therein a cylindrical cavity 21 mounted between circular wave guide sections 22 and 23. Cavity 21 comprises a tubular member 11 which forms the cylindrical wall and end plates 26 and 27 of conductive material. The cylindrical wall may also be constructed in a manner similar to wave guide section 20 of Fig. 3. Surrounding the cavity and concentric thereto is a solenoid 16 which supplies a magnetic field parallel to the longitudinal axis of the cavity. The exciting current for the solenoid is derived from a source 17 through a potentiometer 18 having a variable contact 19.

In the embodiment of Fig. 4, plane polarized waves are introduced to the cavity resonator circuit through a rectangular wave guide section 24. These plane polarized waves are converted to positive circularly polarized waves by converter 25 which may be of suitable type such as described in "Principles and Applications of Wave Guide Transmission" by G. C. Southworth, D. Van Nostrand Company (1950) pages 329 and 330. The converted waves are introduced into the cavity 21 through wave guide section 22. The wave guide sections are preferably of dimensions to support the dominant mode only. Cavity 21 is of length $l$, $$l=\frac{\lambda}{2} \quad (3)$$

or any odd multiple thereof where $\lambda$ is the wavelength at which the cavity is to resonate. The cylindrical wall of Hall effect material is at least a skin depth in thickness at the lowest input signal frequency. In the presence of the magnetic field, the positive circularly polarized waves traveling in the resonant cavity experience an increase in their propagation velocity. The actual propagation velocity $c$, as explained with reference to Equation 1, is dependent in this embodiment upon the magnetizing field which may be controlled by changing the exciting current in the solenoid 16 through potentiometer 18 and contact 19. As the velocity $c$ is related to the transmitted signal according to the equation $$c=\lambda f \quad (4)$$

where $\lambda$ is fixed by the length $l$ of the cavity, the frequency $f$ of the transmitted signal varies directly as the propagation velocity. Hence, it is clear that the resonant output frequency at wave guide section 23 may be determined by controlling the intensity of the magnetic field.

It is obvious that the Hall effect material of the cylindrical wall may be prepolarized to provide a constant frequency resonator and to thereby eliminate solenoid 16 and current source 17. Further, cavity 21 may be constructed completely of Hall effect material or just the end plates may be of Hall effect material.

The advantages of the invention are many. One important advantage over the devices in the prior art is that in using Hall effect material the alteration of the velocity of propagation is achieved with substantially only a skin depth of wave penetrations and it is this characteristic which makes the tubular structure practical. Another important advantage is that a tubular structure channels the wave so that there are no reflection losses and matching problems are substantially eliminated. A further advantage is that the Hall effect material used has high impedance characteristics which is desirable in many microwave applications and particularly in cavity tuners. In addition, as Hall effect materials are not limited in their operative range at microwave frequencies the embodiments disclosed herein are operative over a broader frequency range than any of the structures for controlling the velocity of electromagnetic waves known in the prior art.

Although the present invention has been described largely in terms of specific embodiments, it will be understood that these are in part illustrative and that various other embodiments within the spirit and scope of the invention will be evident to those skilled in the art.

What is claimed is:

1. An apparatus for effecting antireciprocal rotation of the plane of polarization of electromagnetic waves of wave lengths longer than those of the visible spectrum comprising a tubular section of metallic material, a further tubular section of Hall effect material concentric with and contiguous to the inner surface of said metallic section, said further section having a wall thickness substantially equal to the skin depth thickness at the lowest operating frequency for said waves, means for launching plane polarized waves for propagation through said tubular section in the direction of the longitudinal axis, means for magnetically polarizing said Hall effect material in the direction of propagation of said waves whereby the plane of polarization of said electromagnetic waves is rotated, said means comprising a coil coaxial with and external to said tubular sections, and means for utilizing said rotated plane waves.

2. In an electromagnetic wave transmission system, a source of linearly polarized wave energy, means for producing antireciprocal rotation of the direction of polarization of said wave energy coupled to said source, said rotating means comprising a hollow, tubular section of Hall effect material selected from the group consisting of bismuth, germanium and indium antimony, said section having a radial dimension substantially equal to the skin-depth thickness for said wave energy, means for magnetically polarizing said material in the direction of wave energy flow through said section, and means coupled to said section adapted to utilize said rotated wave energy.

3. In an electromagnetic wave transmission system, a device for producing nonreciprocal rotation of electromagnetic wave energy propagating therethrough comprising a thin tubular section of Hall effect material having a wall thickness substantially equal to the skin-depth thickness at the lowest operating frequency for said energy, means for magnetically biasing said material in the direction of the longitudinal axis of said section, means for applying wave energy having a given direction of polarization to one end of said section for propagation therethrough and means adapted for utilizing said rotated wave energy connected to the other end of said section.

References Cited in the file of this patent

UNITED STATES PATENTS

| | | |
|---|---|---|
| 2,197,123 | King | Apr. 16, 1940 |
| 2,402,948 | Carlson | July 2, 1946 |
| 2,536,805 | Hansen | Jan. 2, 1951 |
| 2,649,574 | Mason | Aug. 18, 1953 |
| 2,650,350 | Heath | Aug. 25, 1953 |
| 2,743,322 | Pierce | Apr. 24, 1956 |
| 2,748,353 | Hogan | May 29, 1956 |
| 2,777,906 | Shockley | Jan. 15, 1957 |
| 2,784,378 | Yager | Mar. 5, 1957 |
| 2,787,765 | Fox | Apr. 2, 1957 |
| 2,844,799 | Fox | July 22, 1958 |
| 2,849,642 | Goodall | Aug. 26, 1958 |

FOREIGN PATENTS

| | | |
|---|---|---|
| 674,874 | Great Britain | July 2, 1952 |

OTHER REFERENCES

Lavine: "The Review of Scientific Instruments," vol. 29, No. 11, November 1958, pages 970–976.